(12) United States Patent
Maes (10) Patent No.: US 10,819,573 B2
(45) Date of Patent: Oct. 27, 2020

(54) HIERARCHICAL COHERENCY FOR NETWORK FUNCTION VIRTUALIZATION

(71) Applicant: Ciena Corporation, Hanover, MD (US)

(72) Inventor: Richard Donald Maes, Spokane Valley, WA (US)

(73) Assignee: Ciena Corporation, Hanover, MD (US)

( * ) Notice: Subject to any disclaimer, the term of this patent is extended or adjusted under 35 U.S.C. 154(b) by 37 days.

(21) Appl. No.: 15/926,459

(22) Filed: Mar. 20, 2018

(65) Prior Publication Data

US 2019/0296976 A1 Sep. 26, 2019

(51) Int. Cl.
*H04L 12/24* (2006.01)
*G06F 9/455* (2018.01)
*H04L 12/46* (2006.01)

(52) U.S. Cl.
CPC ...... *H04L 41/0859* (2013.01); *G06F 9/45558* (2013.01); *H04L 12/4641* (2013.01); *G06F 2009/45595* (2013.01)

(58) Field of Classification Search
CPC ............. H04L 41/0859; H04L 12/4641; G06F 9/45558; G06F 2009/45595

USPC ......................................................... 370/254
See application file for complete search history.

(56) References Cited

U.S. PATENT DOCUMENTS

| | | | | |
|---|---|---|---|---|
| 9,525,636 | B2* | 12/2016 | Djekic | H04L 12/54 |
| 2016/0373474 | A1* | 12/2016 | Sood | G06F 21/50 |
| 2017/0026304 | A1* | 1/2017 | Djekic | H04L 47/6215 |
| 2017/0187572 | A1* | 6/2017 | Wu | H04L 41/145 |
| 2017/0310611 | A1* | 10/2017 | Kumar | H04L 67/2842 |
| 2019/0044856 | A1* | 2/2019 | Fischetti | H04L 45/745 |
| 2019/0052549 | A1* | 2/2019 | Duggal | G06Q 30/04 |
| 2019/0069187 | A1* | 2/2019 | Ashrafi | H04W 52/0206 |

* cited by examiner

*Primary Examiner* — Hassan A Phillips
*Assistant Examiner* — Mohammed S Chowdhury
(74) *Attorney, Agent, or Firm* — Clements Bernard Walker; Lawrence A. Baratta, Jr.; Christopher L. Bernard (57) ABSTRACT

Applying a virtual network function (VNF) chain includes storing, in a shared data repository, configuration data used to configure VNFs of the VNF chain within a network node. Hierarchical version control of the configuration data allows VNF's, which are logically arranged in a sequential fashion, yet have the ability to process frames in parallel, to track which frames are governed by a hierarchy that may be manipulated based on external events such as fail-overs, or configuration changes.

16 Claims, 7 Drawing Sheets

HIERARCHICAL COHERENCY FOR NETWORK FUNCTION VIRTUALIZATION

BACKGROUND

A network packet, or simply packet, is a formatted data item that is transmitted by a network. Formatting data into packets allows for packet switching and sharing of network bandwidth among a large number of users. A packet includes control information and user data, which is also known as the payload. Control information includes metadata for delivering the payload, such as source and destination network addresses, error detection codes, etc. Typically, control information is found in packet headers and/or trailers.

Network function virtualization (NFV) is a network architecture and method that virtualize network services traditionally being carried out by proprietary, dedicated hardware. In other words, the NFV replaces dedicated network hardware appliances, such as routers and firewalls, with software executing on general purpose physical network devices (e.g., network servers). The function performed by the software executing on a general purpose physical network device of the NFV architecture is referred to as a virtualized network function (VNF). The software implementing the VNF is referred to as a virtual network application.

A service function is a specific treatment applied to packets by a physical or virtual network device. Examples of service function include firewall, WAN, application acceleration, deep packet inspection, lawful intercept, server load balancing, etc. A service function path is a network path traversed by packets to receive an ordered set of service functions. A service function chain is the ordered set of service functions associated with a service function path. A network service header is a data item containing control information and included in the packets to support the service function chain. The service function, service function path, service function chain, and network service header are described in RFC (Request for Comments) 7665, an Internet Engineering Taskforce memorandum on Internet standards and protocols.

Encapsulation is a scheme that enables an upper network layer to send data via a lower network layer's connection. Encapsulation is performed by adding control information or other metadata (referred to as encapsulation data item) of the upper network layer within payload packets transmitted by the lower network layer. The lower network layer data frame is forwarded to the destination node as a stream of bits, where decapsulation is performed to extract and interpret the data frame at the upper network layer.

SUMMARY

In general, in one aspect, the invention relates to a method for processing a plurality of data frames employing a virtual network function (VNF) chain within a network node. The method involves storing, in a shared data repository, configuration data used to configure a plurality of sequential VNFs of the VNF chain within the network node, selecting, from the configuration data in the shared data repository, a configuration data block based on metadata of a first data frame processed through the VNF chain, and sending, from the shared data repository, the configuration data block to a first VNF of the plurality of sequential VNFs to configure the first VNF. The method further involves configuring each subsequent VNF of the plurality of VNFs in the VNF chain using at least the configuration data block to process the first and subsequent data frames.

In general, in one aspect, the invention relates to a system for processing a plurality of data frames employing a virtual network function (VNF) chain within a network node. The system includes a shared data repository for storing configuration data used to configure a plurality of sequential VNFs of the VNF chain in the network node, a computer processor, and memory storing instructions, when executed, causing the computer processor to select, from the configuration data in the shared data repository, a configuration data block based on metadata of a first data frame processed through the VNF chain, and send, from the shared data repository, the configuration data block to a first VNF of the plurality of VNFs to configure the first VNF. Each subsequent VNF of the plurality of VNFs in the VNF chain is configured using at least the configuration data block to process the first and subsequent data frames.

In general, in one aspect, the invention relates to a non-transitory computer readable medium storing instructions for applying a virtual network function (VNF) chain. The instructions, when executed, causes a computer processor to store, in a shared data repository, configuration data used to configure a plurality of sequential VNFs of the VNF chain within the network node, select, from the configuration data in the shared data repository, a configuration data block based on metadata of a first data frame processed through the VNF chain, and send, from the shared data repository, the configuration data block to a first VNF of the plurality of sequential VNFs to configure the first VNF. The instructions further cause the computer processor to configure each subsequent VNF of the plurality of VNFs in the VNF chain using at least the configuration data block to process the first and subsequent data frames.

Other aspects of the invention will be apparent from the following description and the appended claims.

BRIEF DESCRIPTION OF DRAWINGS

FIGS. 1.1, 1.2, 1.3, 1.4, and 1.5 show block diagrams of a system in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components.

Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for operating a network with hierarchical coherency for network function virtualization. In one or more embodiments of the invention, the network function virtualization provides a virtualized network structure that implements a service function chain (e.g., encapsulation/decapsulation, WRED, TM, etc.). In one or more embodiments of the proposed solution, reconfigurable network function virtualization is provided, wherein a service function chain can be reconfigured on the fly in real-time, while packets are processed in VNF devices, without stranding packets in processing queues between VNFs in a service function chain.

During a service function chain reconfiguration, while frames are passing through a service function chain, some frames may have entered the service function chain before the moment of reconfiguration, and another frame entered after the moment reconfiguration. One or more embodiments ensure that the frames logically entering the service function chain prior to the reconfiguration are processed by a previous service function configuration hierarchy, while later frames are processed by a later service function configuration hierarchy. For example, when the service function chain implements weighted random early drop (WRED) and traffic manager (TM) as VNF applications on the same VNF network node device, a packet is processed according to the same configuration hierarchy version for both WRED and TM. One or more embodiments process the packets correctly even though failover events occur in the network.

In one or more embodiments, the virtualized network structure includes a virtual local area network (VLAN) hierarchy and/or a Multiprotocol Label Switching (MPLS) label stack hierarchy. In one or more embodiments, the virtualized network structure includes a virtual private network (VPN) tunnel hierarchy. The hierarchical coherency of the proposed solution prevents VLAN/MPLS packets from becoming stranded in a virtual function chain following a failover event.

Figure 11:
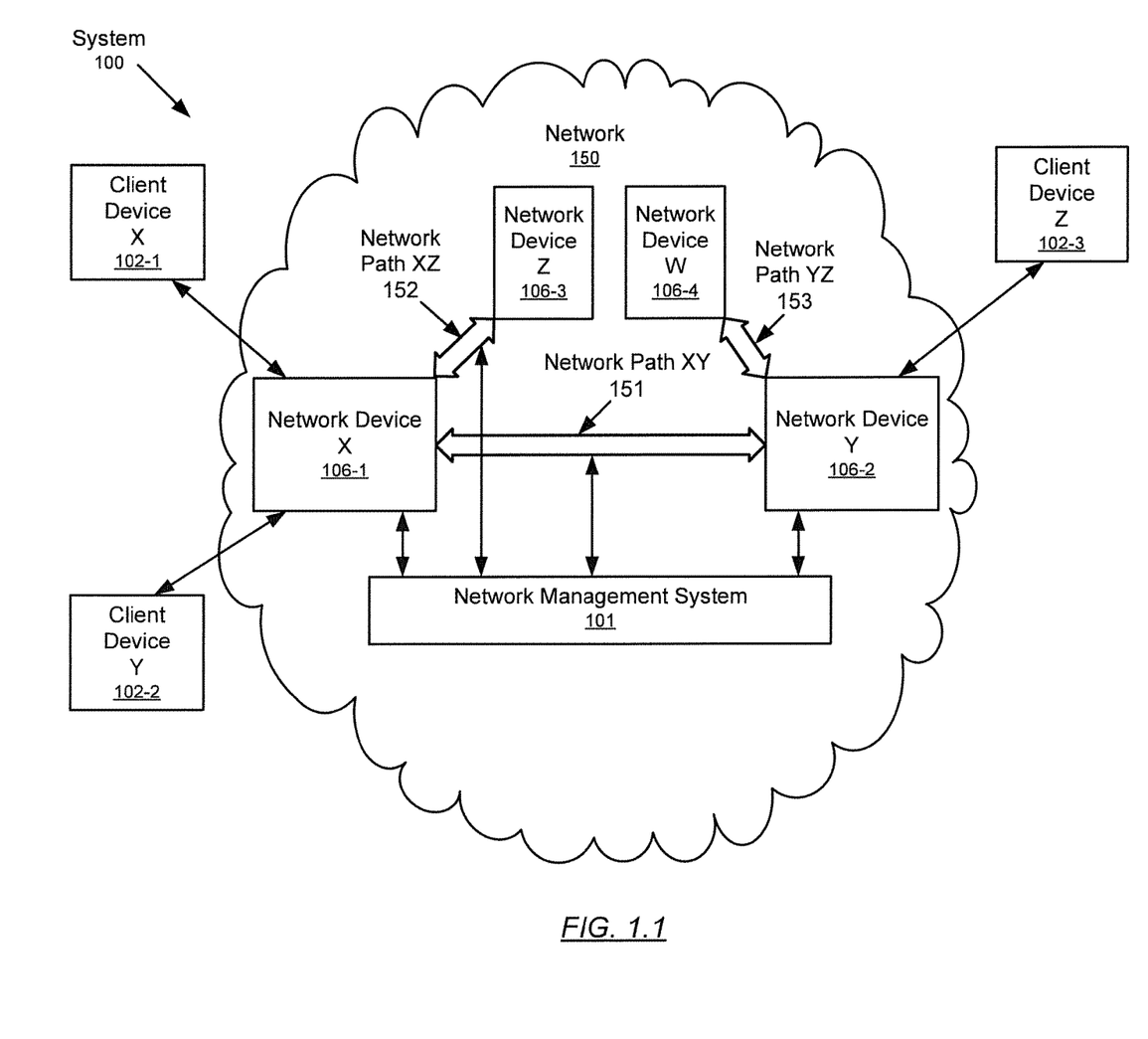

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes multiple client devices (e.g., client device X (102-1), client device Y (102-2), client device Z (102-3), etc.) connected by a network (150) in accordance with one or more embodiments. A network is a set of interconnected computing devices that are configured to receive and forward packets in order to transmit information from a source client device to a destination client device. In one or more embodiments of the invention, the network (150) includes one or more of a local area network (LAN), a wide area network (WAN), a telecommunication network, etc, and may include wired and/or wireless portions of the Internet.

In general, the network (150) provides network services to the client devices (e.g., client device X (102-1), client device Y (102-2), client device Z (102-3), etc.). In particular, the network services are provided by one or more service providers operating the network (150), or a portion thereof, to one or more users of the client devices. In this context, the network (150) or a portion thereof may be referred to as a service provider network. For example, one or more client devices (e.g., client device X (102-1), client device Y (102-2), client device Z (102-3), etc.) may be configured to send data over the network (150). Similarly, one or more client devices (e.g., client device X (102-1), client device Y (102-2), client device Z (102-3), etc.) may be configured to receive data over the network (150). In one or more embodiments, the network services allow the client devices (e.g., client device X (102-1), client device Y (102-2), client device Z (102-3), etc.) to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices.

The client devices (e.g., client device X (102-1), client device Y (102-2), client device Z (102-3), etc.) may be computing devices of any type including mobile phones, desktop or tablet personal computers (PCs) used by the users, routers, switches or servers operated by the users for accessing the network (150), or other devices operated by the users. Examples of the client devices (e.g., client device X (102-1), client device Y (102-2), client device Z (102-3), etc.) may correspond to various portions of the computing system described in reference to FIG. 4 below.

Within the network (150), the network device X (106-1), network device Y (106-2), network device Z (106-3), network device W (106-4), etc., may be computing devices of any type, including servers, routers, switches, etc., operated by one or more service providers of the network (150). In one or more embodiments, one or more of the network device X (106-1), network device Y (106-2), network device Z (106-3), network device W (106-4), etc., execute a virtual network application or include a virtual network device. Each network device (e.g., network device X (106-1), network device Y (106-2), network device Z (106-3), network device W (106-4)) may have one or more ports, which are physical and/or logical interfaces for communicating with other network devices. Examples of the network devices (e.g., network device X (106-1), network device Y (106-2), network device Z (106-3), network device W (106-4)) of the network (150) may correspond to various portions of the computing system described in reference to FIG. 4 below.

Further, a network path (e.g., network path XY (151), network path XZ (152), network path YZ (153)) is an ordered sequence of one or more network links, one or more intermediate elements, and/or any intervening devices that connect two network devices through which network packets flow. A network link may be a connection between two ports residing on two separate network devices (i.e., external link) or within a single network device (i.e., internal link). In one or more embodiments, a network device may be connected to multiple network paths. For example, the network device X (106-1) is connected to the network path XY (151) and the network path XZ (152). In one or more embodiments, multiple network paths may exist between two network devices. Accordingly, packets or other telecommunication data may be exchanged between the two network devices via one or more of the network paths. In one or more embodiments, the network path XY (151) is used to provide the network services to the client device X (102-1), client device Y (102-2), and client device Z (102-3) where the network device X (106-1) and network device Y (106-2) act as the ingress/egress nodes (i.e., edge network devices) to the network (150). In one or more embodiments, the network (150) includes multiple layers according to a layered network architecture, such as the seven-layer OSI model of computer networking. In such embodiments, the network paths (e.g., network path XY (151)) may include network links, intermediate elements, and/or any intervening devices that support or otherwise are associated with one or more network layers. In one or more embodiments, one or more network paths (e.g., network path XY (151), network path XZ (152), network path YZ (153)) corresponds to a service function path with an associated service function chain.

A service function path is a particular network path traversed by packets to receive an ordered set of service functions provided by particular devices along the network path. In other words, as packets travel on a service function path, the packets are processed according to service functions provided by each device (e.g., network devices) along the path. The ordering of the devices on the network path is the order of the service functions in an ordered set. A service function chain is the ordered set of service functions corresponding to a service function path. In other words, the service function chain is the ordered set of service functions along the service function path. A service function path or service function chain may reside, in part or in all, on a single physical network device. In such scenario, service functions in the service function path or service function chain may execute on the same physical network device. In one or more embodiments, a service function chain is implemented in its entirety in one VNF network element via different VNF functions of the network element. In such embodiments, the aforementioned hierarchical coherence ensures or otherwise provides correct packet processing in the single network element.

As further shown in FIG. 1.1, the network (150) includes a network management system (101) in accordance with one or more embodiments. Network management is the process of administering and managing the network (150). The network management system (101) has many functions including network service provisioning, network monitoring, fault analysis, performance management, etc. In one or more embodiments, network monitoring is performed to monitor the network (150) for detecting slow or failing elements of the network (150) and to notify the service provider(s) in case of outages or other service interruptions.

In response to the notification, the network management system (101) may perform one or more network management tasks to mitigate or otherwise address the outages and service interruptions. For example, the network management tasks may include fault analysis and performance management for maintaining quality of service of the network (150).

In one or more embodiments, the network management system (101) is a dedicated device separate from the network devices (e.g., network device X (106-1), network device Y (106-2), network device Z (106-3), network device W (106-4)) that transmit information between the client devices. In one or more embodiments, at least a portion of the network management system (101) may be distributed and reside within the network devices (e.g., network device X (106-1), network device Y (106-2), network device Z (106-3), network device W (106-4)) that transmit information between the client devices.

Although FIG. 1.1 only shows three client devices (e.g., client device X (102-1), client device Y (102-2), client device Z (102-3)), four network devices (e.g., network device X (106-1), network device Y (106-2), network device Z (106-3), network device W (106-4)), and three network paths (e.g., network path XY (151), network path XZ (152), network path YZ (153)), those skilled in the art, having the benefit of this detailed description, will appreciate that the system (100) may have any number of client devices, network devices, and network paths. Further, different network paths may share one or more devices or have different devices altogether.

Figure 12:
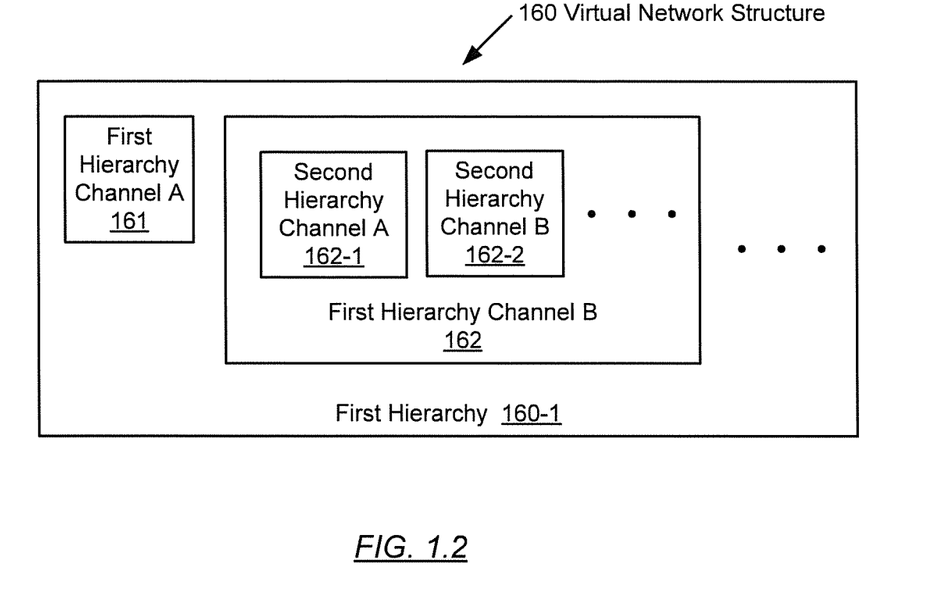

In one or more embodiments, a portion of the network (150) may be provisioned as a virtual network structure described in detail below. Based on the network function virtualization technology, network devices, links, and other resources of the network (150) may be logically divided into virtualized functional blocks. In one or more embodiments, the virtual network structure is a structure of virtualized functional blocks (e.g., virtual network devices) that connect, or chain together, to create communication services. In one or more embodiments, the VNFs of the virtual network devices in the virtual network structure are used to implement the aforementioned service functions when the virtual network structure corresponds to a service function chain. For example, the network path XY (151) may be part of a virtual network structure, such as a tunnel or a VPN. In another example, a portion of the bandwidth of the network path XY (151) may be provisioned as a virtual network structure (160) described in reference to FIG. 1.2 below.

In one or more embodiments, a portion of the virtualized functional blocks in the virtual network structure (160) are chained together to form a logical connection medium referred to as a channel of the virtual network structure (160). In other words, a channel is a logical connection medium and includes a portion of the virtualized functional blocks that are chained together. In one or more embodiments, the virtual network structure (160) and channels are hierarchical.

FIG. 1.2 shows the virtual network structure (160) that is organized as a first hierarchy (160-1) having a first hierarchy channel A (161), a first hierarchy channel B (162), etc. A hierarchy channel is a channel in a hierarchy, such as the first hierarchy (160-1). Further, the first hierarchy channel B (162) includes a second hierarchy channel A (162-1), a second hierarchy channel B (162-2), etc. In this context, each of the first hierarchy channel A (161) and first hierarchy channel B (162) is considered as a channel "within" a channel. Similarly, each of the second hierarchy channel A (162-1) and second hierarchy channel B (162-2) is considered as a channel "within" a channel "within" a channel. In one or more embodiments, the hierarchies or channels of the virtual network structure (160) correspond to the network layers having hierarchical encapsulations. For example, the second hierarchy channel A (162-1) and second hierarchy channel B (162-2) correspond to upper network layers with respect to the first hierarchy channel B (162). In other words, the first hierarchy channel B (162) corresponds to a lower network layer with respect to the second hierarchy channel A (162-1) and/or second hierarchy channel B (162-2). In one or more embodiments, the channels of the virtual network structure (160) are VLAN, MPLS, tunnels, or parts of a VPN, etc. A tunnel is a channel based on a tunneling protocol that uses the data portion of a packet (the payload) to carry the packets that actually provide the service. Tunneling uses a layered protocol model such as those of the OSI or TCP/IP protocol suite, but usually violates the layering when using the payload to carry a service not normally provided by the network. Examples of layered tunneling protocol include Generic Routing Encapsulation (GRE) protocol, Layer 2 Tunneling Protocol (L2TP), secure Multiprotocol Label Switching (MPLS) protocol, etc. In one or more embodiments, the channel corresponding to the first hierarchy (160-1) encompasses multiple layers of channels and couples to ingress port and/or egress port of a network device. From the perspective of the network device, the first hierarchy (160-1) corresponds to an ingress port and/or egress port.

Although FIG. 1.2 only shows two levels of hierarchies and four hierarchy channels, those skilled in the art, having the benefit of this detailed description, will appreciate that the virtual network structure (160) may have any number of hierarchical levels and/or hierarchy channels. Further, the virtual network structure (160) may include other types of virtualized building blocks. An example of the virtual network structure (160) is described in reference to FIG. 3.1 below.

Figure 13:
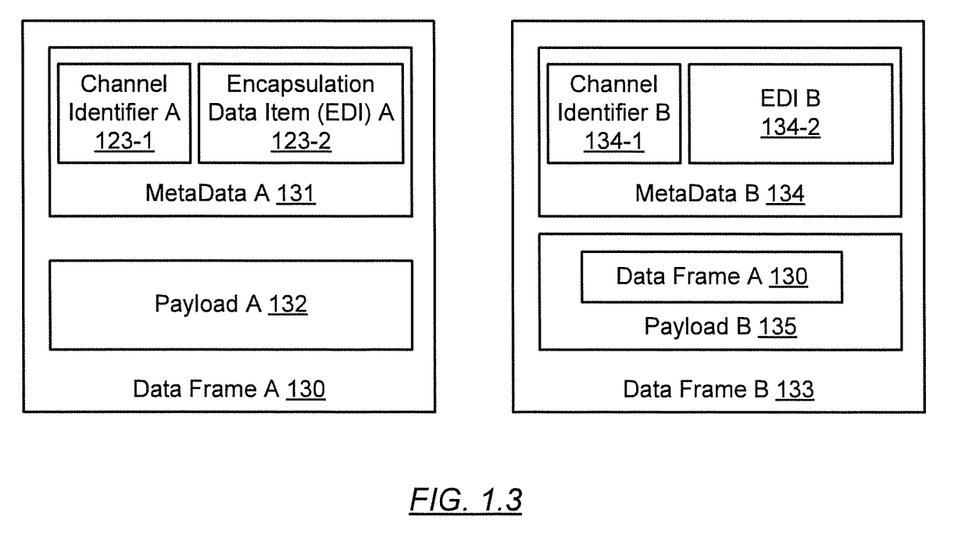

Generally, communication data may be transmitted in the network (150) in individual packet collections that are referred to as data frames, such as the data frame A (130) and data frame B (133) depicted in FIG. 1.3. For communication data transmitted over the virtual network structure (160), control information and/or other metadata are encapsulated for each channel. As shown in FIG. 1.3, the data frame A (130) includes the metadata A (131) and payload A (132) that are transmitted via a channel of the virtual network structure (160). The payload A (132) includes packets of the communication data. The metadata A (131) includes a channel identifier A (123-1) to identify the channel. For example, the channel identifier A (123-1) identifies that the data frame A (130) is transmitted via the second hierarchy channel A (162-1). In addition, the metadata A (131) includes encapsulation data item (EDI) A (123-2) that includes control information and/or other metadata specific to the second hierarchy channel A (162-1). In one or more embodiments, the encapsulation data item is unique for each channel. In other words, different data frames transmitted via a channel include the same encapsulation data item while data frames transmitted via different channels (of the same hierarchy or different hierarchies) include different encapsulation data items. For example, control information and/or other metadata in the encapsulation data item is unique to a particular MPLS tunnel. In MPLS, a label-switched path (LSP) hop repackages traffic data into a different form that is specific to the destination MPLS link partner tunnel. Effectively, repackaging traffic data may include the removal or addition of multiple hierarchical layers in the form of a MPLS label IDs in the MPLS label stack, manipulation of L2 addressing specific to the link partner and potentially other VLAN and MPLS header modifications.

In one or more embodiments, the data frame A (130) is further encapsulated inside an upper layer data frame (i.e., data frame B (133)) for further transmission via the first hierarchy channel B (162). The data frame B (133) includes the metadata B (134) and payload B (135) that are transmitted via the first hierarchy channel B (162). The payload B (135) includes the data frame A (130). The metadata B (134) includes a channel identifier B (134-1) identifying that the data frame B (133) is transmitted via the first hierarchy channel B (162). In addition, the metadata B (134) includes EDI B (134-2) that includes control information and/or other metadata specific to the second hierarchy channel A (162-1). Although not explicitly shown, the data frame B (133) may be further encapsulated inside yet another upper layer data frame for further transmission via one or more virtualized building blocks corresponding to the first hierarchy (160-1). In other words, the data frame A (130) may be hierarchically encapsulated inside multiple layers of data frames.

In one or more embodiments, the encapsulation or decapsulation (encap/decap) of data frames is performed using a service function within a service function chain. In other words, the encap/decap operation is a VNF provided by a virtualized network structure. In one or more embodiments, the virtualized network structure may include other VNFs configured to perform additional service functions, such as weighted random early drop (WRED), traffic manager (TM), etc. Similar to the encap/decap data items used by the encap/decap VNF to perform the encap/decap service function, the WRED VNF and TM VNF may use respective hierarchical VNF data to perform the respective service functions. Relative to WRED, the hierarchical VNF data may be WRED profiles for each packet. For TM, the hierarchical VNF data may be scheduling shaper profiles defined for each layer of the hierarchy.

Figure 14:
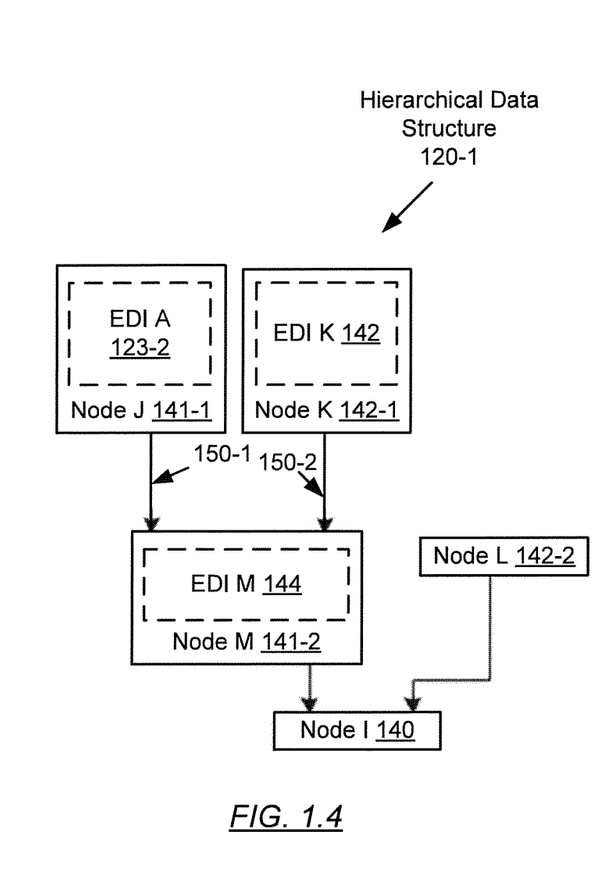

In one or more embodiments, parent-child relationships in the hierarchy of the virtual network structure (160) is stored in a hierarchical data structure. In other words, the parent-child relationships in the hierarchical data structure (120-1) correspond to the parent-child relationships in the virtual network structure (160). In one or more embodiments, the parent-child relationships are represented by hierarchical links. FIG. 1.4 shows an example hierarchical data structure (120-1) that includes leaf nodes (i.e., node J (141-1), node K (142-1), node L (142-2)) and non-leaf nodes (i.e., node M (141-2), node I (140)). As shown in FIG. 1.4, each arrow points from a child node to a parent node is a hierarchical link representing the parent-child relationship of two linked nodes. A leaf node is a node that does not have any child node. A non-leaf node is a parent node to at least one child node. In particular, the node M (141-2) is a parent node of the node K (142-1) and node L (142-2). Similarly, the node I (140) is a parent node of the node J (141-1) and node M (141-2).

Each node corresponds to an individual channel of the virtual network structure. Corresponding to FIG. 1.2, the node J (141-1), node K (142-1), node L (142-2), node M (141-2), and node I (140) depicted in FIG. 1.4 represent the second hierarchy channel A (162-1), second hierarchy channel B (162-2), first hierarchy channel A (161), first hierarchy channel B (162), and the first hierarchy (160-1), respectively, of the virtual network structure (160).

In one or more embodiments, each node references a location in a data repository for storing the encapsulation data item and/or other VNF data of the corresponding channel. For example, the node J (141-1) corresponds to the second hierarchy channel A (162-1) and references the location where the aforementioned EDI A (123-2) is stored. Similarly, the node K (142-1) and node M (141-2) reference the locations where additional VNF data (i.e., EDI K (142) and EDI M (144), respectively) are stored. The hierarchical data structure (120-1) is any data structure that maintains a hierarchy having a parent child relationship between nodes. Examples of a hierarchy include logical trees, logical forests, and partially ordered sets. For example, a logical tree has a specific numbers of nodes, leaf nodes, non-leaf nodes, parent nodes, and child nodes, whereby each child node has a parent node and each parent node has one or more child nodes. The hierarchical data structure (120-1) may have any number of nodes, leaf nodes, non-leaf nodes, parent nodes, and child nodes. In addition, the hierarchical data structure (120-1) may also be organized in different format from FIG. 1.2, such as a linked list, a graph, etc. In one or more embodiments, the hierarchy of the channels of the virtual network structure (160) is reconfigurable, e.g., by the network provisioning server (101).

Figure 15:
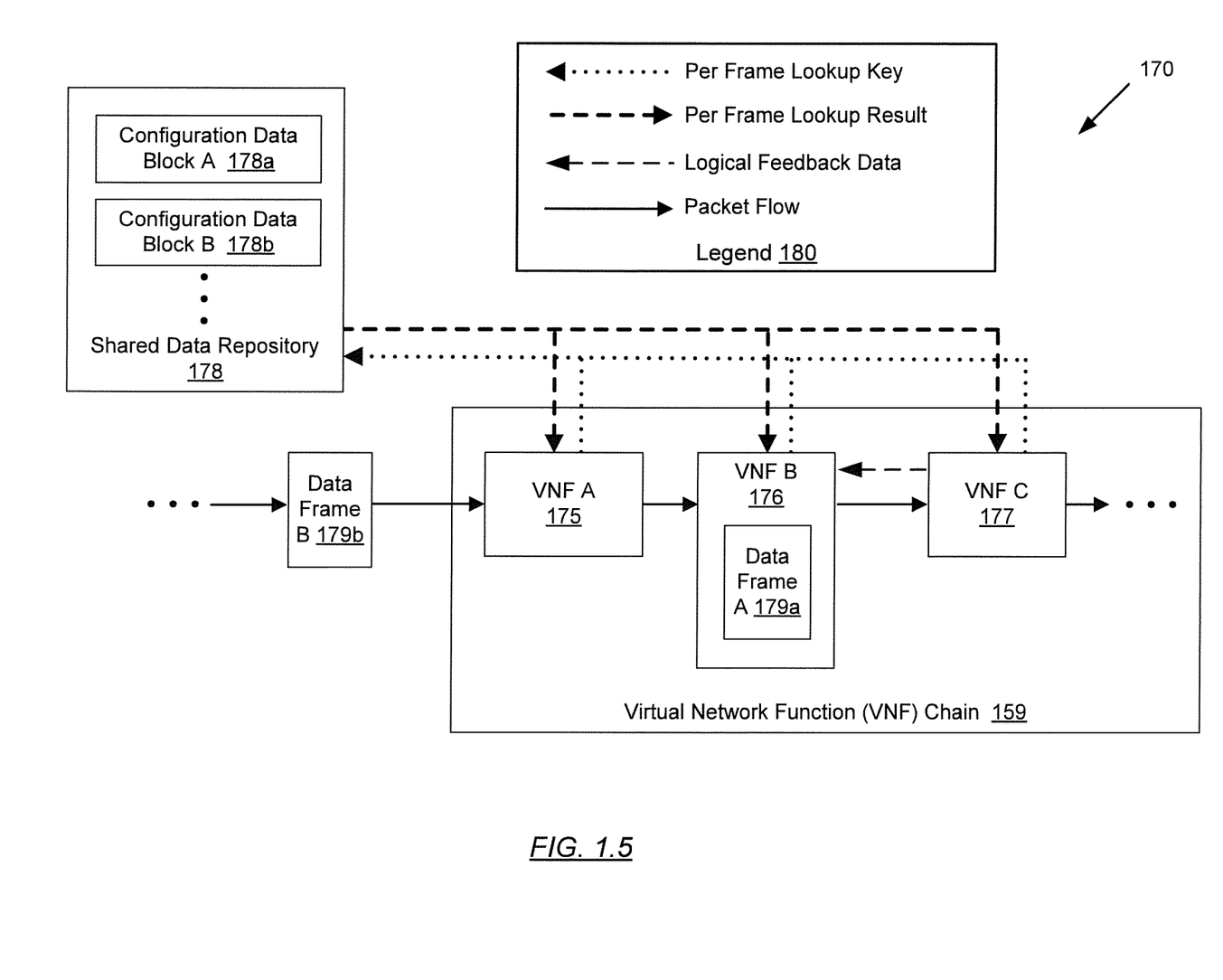

FIG. 1.5 shows a block diagram of hierarchical coherency in a software based NFV solution (170) for a network node within the network path (151) depicted in FIG. 1.1 above. In particular, the software based NFV solution (170) includes a shared data repository (178) storing a combination of VNF data used by VNFs of the network path (151), such as the VNF A (175), VNF B (176), VNF C (177), etc. that collectively form a VNF chain (159) on the network node. In one or more embodiments, the VNF chain (159) forms a service function chain to process the data frames (e.g., data frame A (179*a*), data frame B (179*b*)) flowing through the network path (151). For example, the data frame A (179*a*), having passed through and been processed by the VNF A (175), is in a software buffer for processing by the VNF B (176). In contrast, the data frame B (179*b*) has yet to enter the network path (151) for processing by the service function chain. In one or more embodiments, the VNF chain (159) is contained in a single network node within the network path (151) depicted in FIG. 1.1 above.

In one or more embodiments, the data frames (e.g., data frame A (179*a*), data frame B (179*b*)) include respective versions identified by metadata and is used to select appropriate configuration data blocks (e.g., configuration data block A (178*a*), configuration data block B (178*b*)) stored in the shared data repository (178). Each configuration data block includes VNF data used by a VNF of the VNF chain (159) for processing the data frames in a VNF device. In one or more embodiments, the configuration data block is a hierarchical data structure described in reference to FIGS. 1.1-1.4 above. In one or more embodiments, the shared data repository (178) is configured to store multiple versions of the configuration data blocks for multiple (e.g., all) VNFs of the VNF chain (159). For example, the configuration data block A (178*a*) and configuration data block B (178*b*) correspond to different VNFs and include different versions of VNF data used by each VNF.

As shown in FIG. 1.5 according to the legend (180), the VNF A (175), VNF B (176), and VNF C (177) retrieve appropriate configuration data blocks from the shared data repository (178) and apply respective service functions to the data frames in the packet flow. In one or more embodiments, the VNF A (175), VNF B (176), and VNF C (177) are within a single network node. The data frame flowing through the network node includes metadata (e.g., a tag) that identifies the version of the configuration data blocks. In one or more embodiments, the VNF A (175), VNF B (176), and VNF C (177) retrieve, for each data frame, the configuration data blocks of the identified version in a single look up from the shared data repository (178). For example, the single look up and corresponding response are depicted as the dotted lines and dashed lines, respectively, in FIG. 1.5. In one or more embodiments, the VNF A (175), VNF B (176), and VNF C (177) apply the service functions with hierarchical coherency using the method described in reference to FIG. 2 below. An example of the VNF A (175), VNF B (176), and VNF C (177) applying the service functions with hierarchical coherency is described in reference to FIG. 3 below.

Figure 2:
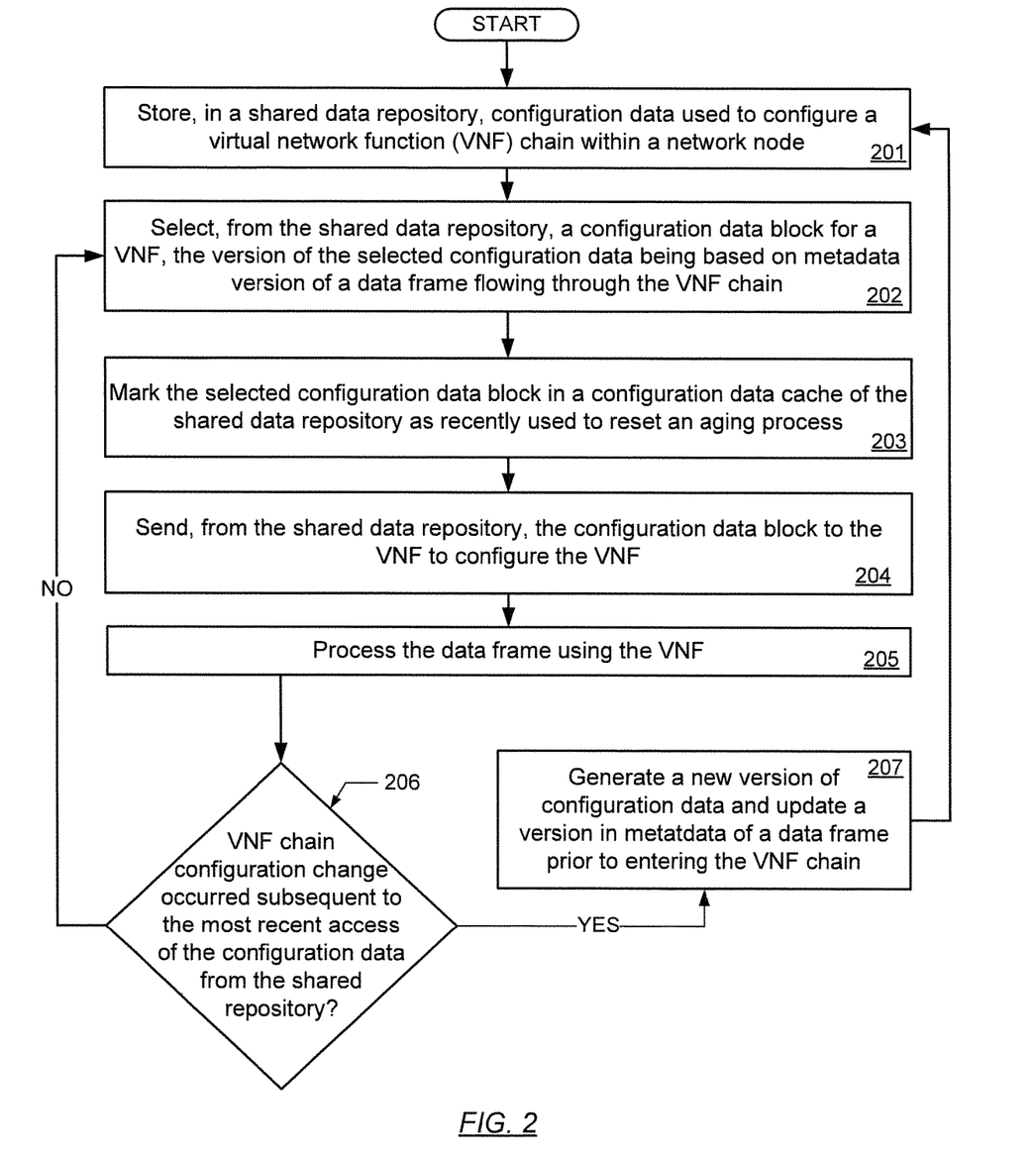
FIG. 2 shows a flowchart in accordance with one or more embodiments of the invention.

FIG. 2 shows a flowchart in accordance with one or more embodiments. The process depicted in FIG. 2 may be used to offload encapsulation data item look up from a data path processor of a network device to an encapsulation engine of the network device. The process shown in FIG. 2 may be executed, for example, by one or more components discussed above in reference to FIGS. 1.1-1.5. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, in Step 201, configuration data used to configure virtual network functions (VNFs) of a VNF chain is stored in a shared data repository within a VNF device/node. In one or more embodiments of the invention, the configuration data includes multiple versions where each version includes multiple configuration data blocks corresponding to the multiple VNFs. In one or more embodiments, the VNF chain is contained in a network node. In one or more embodiments, a configuration data cache is generated based on access history of the configuration data. For example, the configuration data cache may store recently accessed configuration data blocks of various VNF software versions.

In Step 202, a configuration data block for a VNF is selected from the shared data repository. The version of the configuration data block is based on metadata of a data frame flowing through the network node, in particular, the VNF chain. In one or more embodiments, the metadata includes a version identifier (e.g., a number, an alpha numerical value, etc.) that is used to select the configuration data block from the shared data repository. In other words, the version of the configuration data contained in the selected configuration data block is based on the metadata version identifier. In one or more embodiments, selecting the configuration data block includes traversing the hierarchical data structure of the corresponding version to retrieve the VNF data for the VNF. In one or more embodiments, selecting the configuration data block includes selecting previously retrieved VNF data for the VNF in response to detecting a cache hit.

In Step 203, the configuration data block selection is marked as recently accessed in an access history record of the configuration data. From time to time, the configuration data cache is updated according to the access history using a pre-determined caching algorithm. For example, marking entries as recently used resets an aging process used to remove stale configuration data blocks. A configuration data block that has not been accessed in a while is a candidate for removal via the aging process to make room for new more current configuration data blocks.

In Step 204, the selected configuration data block is sent to the VNF and used to configure the VNF. In one or more embodiments, configuring the VNF includes updating the VNF data, such as hierarchical encapsulation data items of selected channels used by the VNF. In one or more embodiments, a single configuration data look up request based on the metadata of the data frame is received by the shared data repository from the VNF chain. In response to the single configuration data look up request, the configuration data blocks of multiple VNFs in the VNF chain are included in a single response sent to the VNF chain.

In Step 205, the data frame is processed by the VNF. For example, the data frame may be encapsulated using the encapsulation VNF. In other examples, WRED or TM of the data frame may be performed using the WRED VNF or TM VNF. As Step 205 is iteratively performed through the flow described in FIG. 2, the data frame is collectively processed by the VNFs in the VNF chain. An example of processing the data frame using the encapsulation VNF is described in reference to FIG. 3.3 below.

In Step 206, a determination is made as to whether a VNF chain configuration change has occurred subsequent to the most recent (i.e., last) access (e.g., retrieval, selection, updating, etc.) of the configuration data from the shared repository. For example, the VNF chain configuration change may correspond to a change in the hierarchy of the VNF chain.

If the determination is positive, i.e., the VNF chain configuration change has occurred subsequent to the last access, the method proceeds to Step 207 before returning to Step 201. If the determination is negative, i.e., no VNF chain configuration change has occurred subsequent to the last access, the method returns to Step 202.

In Step 207, a new version of the configuration data, and the configuration data blocks therein, is generated according to the VNF chain configuration change. Correspondingly, the version of a data frame yet to enter the VNF chain is updated. For example, the version of the VNF chain configuration may be included in the metadata of the data frame to identify the new version of the configuration data for processing the data frame. Subsequent to generating the new version of the configuration data and updating the data frame yet to enter the VNF chain, the method returns to Step 201 where the new version of the configuration data is stored in the shared data repository and ready to be provided to the VNFs in the VNF chain.

In one or more embodiments, one or more of the Step 206 and Step 207 may be performed concurrently with one or more of Step 202, Step 203, Step 204, and Step 205. Further, one or more of the Step 202, Step 203, Step 204, and Step 205 may be performed concurrently for multiple data frames flowing through the VNF chain in a sequence. As a result of the VNF chain configuration change, the multiple data frames may be processed using different versions of configuration data blocks. For example, a first data frame may enter the network path prior to a second data frame in the sequence. At a particular point of time, the first data frame may be processed by a downstream VNF while the second data frame is processed by an upstream VNF. In one example scenario, the VNF chain configuration change may occur during processing the first data frame by the downstream network node using a first version of configuration data block for the downstream VNF. At the time when the VNF chain configuration change occurs, the second data frame is yet to enter the VNF chain and is updated to a second version. Subsequently, the second data frame is processed by the upstream VNF using a second version of the configuration data block for the upstream VNF while the first data frame has not yet exit from the downstream VNF.

Figure 3:
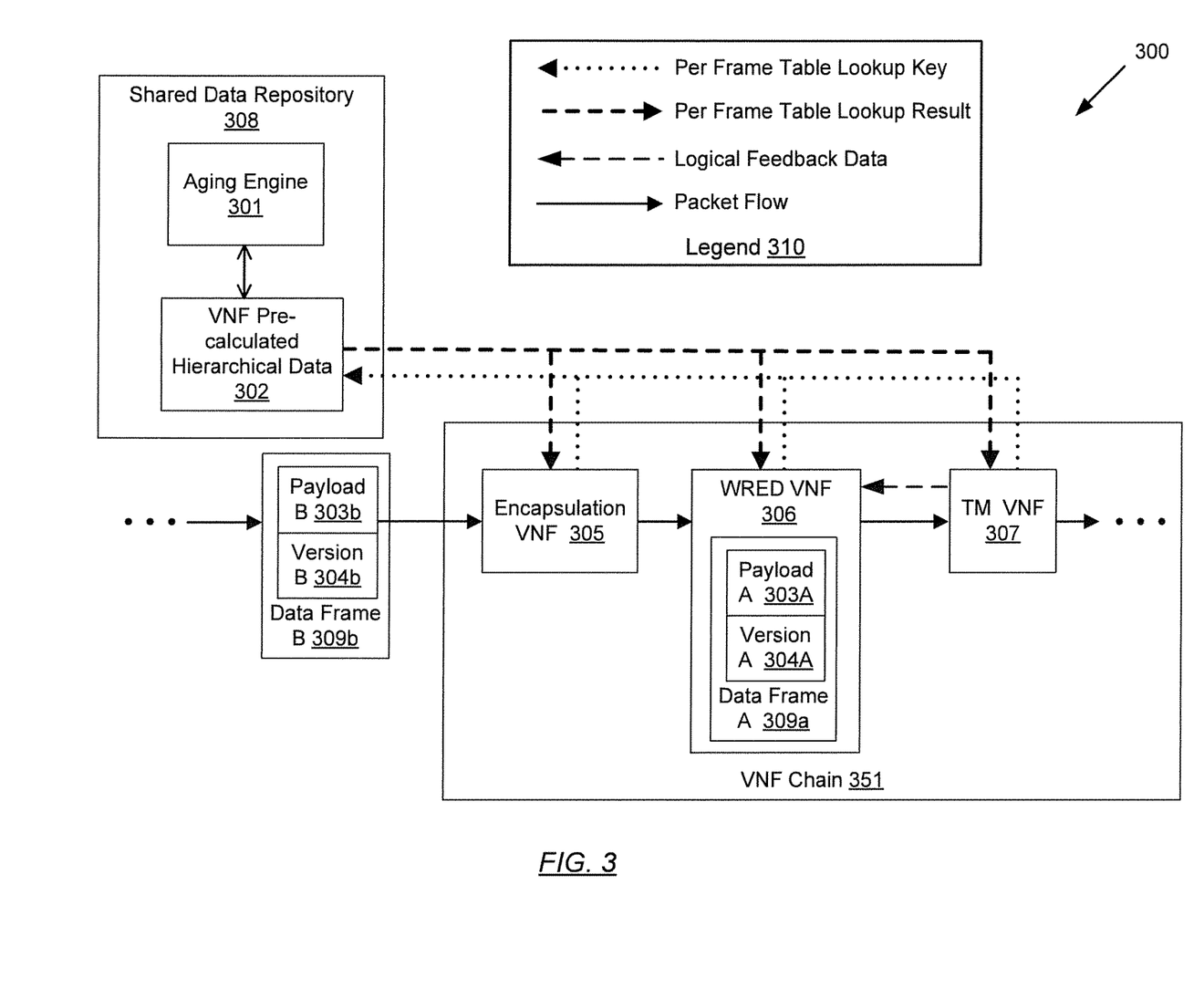
FIG. 3 shows an example in accordance with one or more embodiments of the invention.

FIG. 3 shows an example in accordance with one or more embodiments of the invention. The components and elements of FIG. 3 are collectively referenced below in describing the example. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

FIG. 3 shows an example of hierarchical coherency in a software-based NFV solution (300) where multiple orthogonal (i.e., independent) VNFs use a common hierarchy in a network node to cooperatively implement a purpose built VNF solution specified based on business requirements of a customer of the service provider network. For example, the purpose built solution may be implemented using one or more service function chains based on the VNFs. While the frame processing speed in a hardware (e.g., FPGA) based solution is generally measured in units of "clocks", the software-based NFV solution (300) may take many instructions to process each data frame, during which a hierarchical organization change may occur. Special one clock update logic may be employed to prevent hierarchical inconsistency for the hardware (e.g., FPGA) based solution. For example, a data frame entering a FPGA may be acted upon and judged based on a hierarchical organization stored in software configurable tables. As used herein, the term "judge" refers to the action to classify, shaped, meter, encap/decap, forward, drop, categorize, color, or otherwise process.

The one clock update logic reduces possible table inconsistencies. For the software-based NFV solution (300), a hierarchical organization change may occur while the data frame is in a processing buffer. The longer that it takes for VNF software to process a data frame, the more likely that a larger quantity of data frames are held in the processing buffer when the hierarchical organization is changed. Accordingly, the effect of hierarchical inconsistency is more apparent across many more data frames in the software-based NFV solution (300) as compared to the hardware based solution.

In the example shown in FIG. 3, using the legend (310), the NFV solution (300) includes hierarchical version control of VNFs in a VNF chain to accurately emulate the purpose build solution. In particular, the VNF's (i.e., Encapsulation VNF (305), weighted random early drop (WRED) VNF (306), and traffic manager (TM) VNF (307)) are logically arranged in a sequential order as a service function chain concurrently processing data frames that may be associated with different versions of the common hierarchy of VNF software versions. For example, the hierarchy governing data frames (e.g., data frame A (309*a*), data frame B (309*b*)) may change its version based on external events such as a fail-over event, VNF software update, or other configuration change event. For example, the fail-over, VNF software update, or other configuration change event may result in the hierarchy change described above.

To address the hierarchical coherency requirements, the software-based NFV solution (300) utilizes a shared data repository (308) (e.g., shared hierarchical database) with version control so that a data frame may avoid being judged based on one hierarchical configuration for a given VNF chain and judged on a completely different hierarchical configuration for another VNF chain.

As shown in FIG. 3, the data frame A (309*a*), data frame B (309*b*), Encapsulation VNF (305), WRED VNF (306), TM VNF (307), VNF chain (351), and shared data repository (308) correspond to the data frame A (179*a*), data frame B (179*b*), VNF A (175), VNF B (176), VNF C (177), network path (151), and shared data repository (178), respectively, depicted in FIG. 1.5 above. In addition, the data frames include payload data (e.g., payload A (303a), payload B (303b)) and version (e.g., version A (304a), version B (304b)).

In an example scenario, the system (300) is in the process of having a configuration change. Data frames (e.g., data frame A (309a)) that have passed the Encapsulation VNF (305) prior to the configuration change have already been treated based on the previous configuration hierarchy and are marked by a hierarchy version in the metadata, denoting the earlier of the hierarchical configuration that the frame will use for future treatment (e.g., version A (304a) in the data frame A (309a)). Data frames (e.g., data frame B (309b)) yet to enter the Encapsulation VNF (305) undergoing the configuration change are affected by the change and are marked by inserting a new version into the metadata of the data frame (e.g., version B (304b) in the data frame B (309b)) to be treated accordingly. In one or more embodiments, the new version is inserted into the metadata as a result of looking up the new hierarchy, e.g., of encap/decap data, statistics IDs, shaper profiles, WRED profiles, etc.

Each of the Encapsulation VNF (305), WRED VNF (306), TM VNF (307) has a hierarchical implementation based on the hierarchy of the underlying virtual network structure, an example of which is described in reference to FIGS. 1.2-1.4 above. VNF specific hierarchical data may be added to the hierarchical data structure of the underlying virtual network structure. For example, the VNF encapsulation hierarchy, VNF WRED hierarchy, and TM hierarchy may include hierarchical data that are encapsulation specific, WRED specific, and TM specific, respectively, such as encapsulation header data, label stacks, L2 next hop header data, multiple hierarchical shaper settings for EBS, CBS, CIR and EIR specific to each level of the hierarchy, and multiple hierarchical WRED profiles which may include profile data for yellow, green and red, ingress meters, hierarchical statistics relationships, etc. The Encapsulation VNF (305) may be tunnel based.

The WRED VNF (306) may use the tunnel group concept that checks the queue group depth of various hierarchically related groups within the TM VNF (307) prior to making the WRED decision. The TM VNF (307) may reflect the hierarchy in use in the Encapsulation VNF (305) and provide the queue group depth information for the WRED decision. Further, the TM VNF (307) may provide feedback data to earlier service chains.

Furthermore, managing multiple hierarchical maps may result in the host software jumping around and modify multiple tables to update hierarchy. Such process is not instantaneous and may result in one table indicating one form of hierarchy and another table indicating another hierarchy at any instance during the configuration change. The resultant mismatch of hierarchy and mismatch of data frame processing during the update may cause incorrect statistics, frames exiting the TM via the wrong queue, WRED being decided on the wrong queues, etc.

To reduce or eliminate the impact of such mismatch, the hierarchical data used by the VNFs of the VNF chain (351) is centrally stored in the shared data repository (308) as a common resource available for subscription by all VNF's via an application programming interface (API). For example, the centrally stored hierarchical data may be a combination of the VNF encapsulation hierarchy, VNF WRED hierarchy, and TM hierarchy as a single combined hierarchy. The single combined hierarchy may be a centralized table representing a hierarchical set of tunnels for encapsulation, a hierarchical Quasi-identifier (QID) into the TM profile data, a hierarchical QID into WRED profile data, and other VNF specific hierarchical data.

Any change in the VNF encapsulation hierarchy, VNF WRED hierarchy, and TM hierarchy generates a new version of the single combined hierarchy. Accordingly, a data frame that has been labeled with a particular hierarchical metadata version continues to receives treatment in accordance with that hierarchical version number. Furthermore, any new data frame entering the system (300) is labeled with the current hierarchical version number and receives treatment in accordance with the hierarchical version that is received on entering the system (300).

Due to the size and complexity of VNF specific hierarchical data (e.g., encapsulation data, hierarchical shaper settings, hierarchical WRED profiles, ingress meters, hierarchical statistics relationships, etc.) of the single combined hierarchy, navigating the centrally stored hierarchical data (e.g., linked list lookups, direct lookups, Ternary Content Addressable Memory (TCAM) lookups, etc.) may be time consuming. To improve the performance of accessing the centrally stored hierarchical data, the look up results are stored as VNF pre-calculated hierarchical data (302) in a cache memory of the shared data repository (308). For example, the size of the cache memory for storing the VNF pre-calculated hierarchical data (302) may be set to hold look up results for the data frames that are in transit within a particular VNF or within the data frames that are in transit within the system (300).

In a service provider network where 100,000 services may be supported, the number of data frames in transit within any NFV at given moment may be substantially less (e.g., 1000). For example, the cache memory may include 1000 entries if the software buffers of the VNFs in a service function chain are sized to hold 1000 data frames. The cache memory contents (i.e., VNF pre-calculated hierarchical data (302)) are derived from the logical lookups performed by the VNFs' software control path.

Once all of the hierarchical data is retrieved for a particular tunnel index or other logical interface (i.e., channel identifier), the retrieved data is stored as an entry in the cache memory along with a per-service version number. Additionally, the current version number of the hierarchy is stored in the data frame's metadata along with the hierarchical tunnel index. Accordingly, any other data frame sharing the same hierarchical tunnel index may retrieve the lookup result from the stored cache memory entry, instead of the full table lookup sequence of traversing the single combined hierarchy. When a configuration change occurs for a particular service, the corresponding per service version number is incremented. The per-service version number and the tunnel index may be combined as a single hierarchical key in the data frame metadata.

As needed, each VNF retrieves cache entries of the VNF pre-calculated hierarchical data (302) using the hierarchical tunnel index and the per-service version number. The contents of the VNF pre-calculated hierarchical data (302) changes from time to time and the retrieved entries become outdated. The VNF may determine when to flush individual retrieved cache entry based on the number of data frames that have passed through and the number of cache accesses that have occurred for a particular tunnel index and version. To reduce the cache memory size, an aging engine (301) or cuckoo hash mechanism may be employed in the shared data repository (308) to eject older or otherwise outdated entries in the cache.

Figure 4:
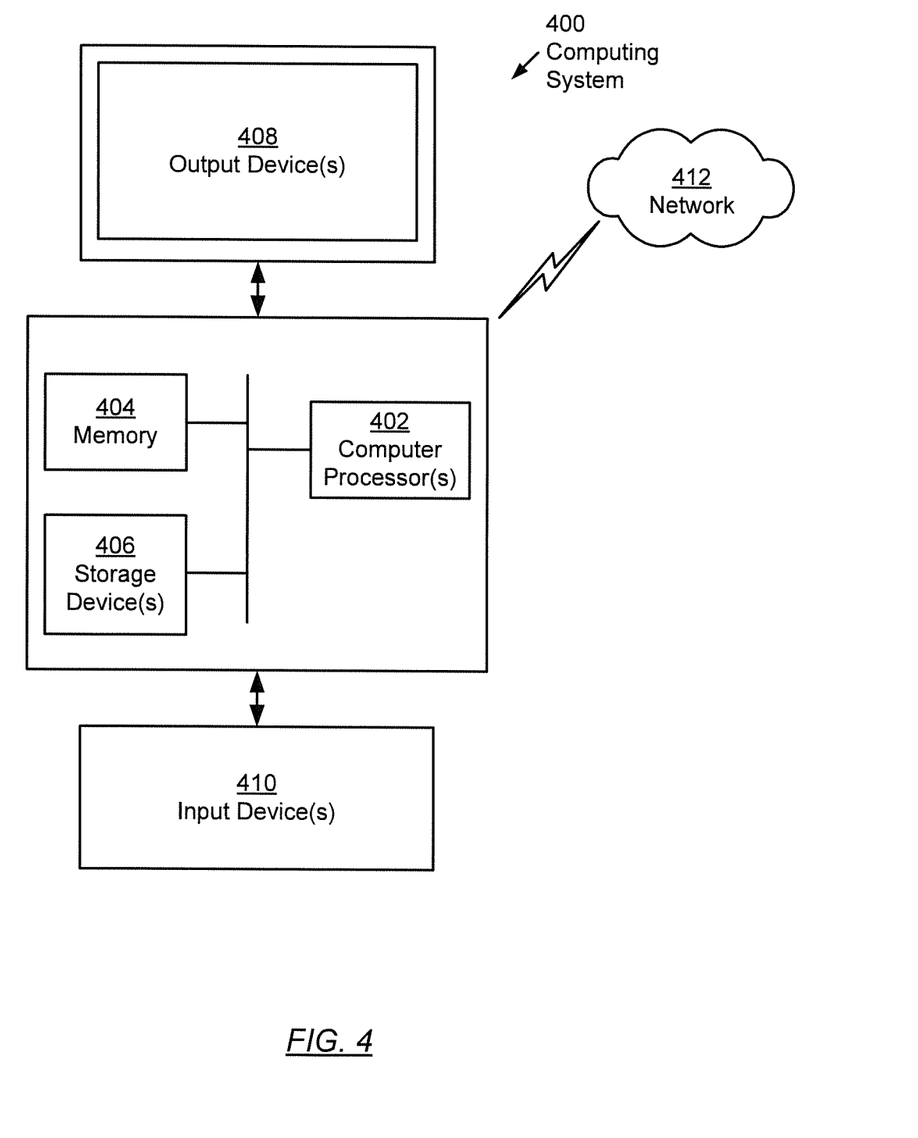
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a plurality of data frames employing a virtual network function (VNF) chain within a network node, comprising:
storing, in a shared data repository, configuration data used to configure a plurality of sequential VNFs of the VNF chain within the network node, the configuration data being stored as a plurality of configuration data blocks, each configuration data block including VNF data used by a respective VNF for processing a data frame;
receiving, by the shared data repository, a single configuration data lookup for the plurality of sequential VNFs of the VNF chain;
selecting, from the configuration data in the shared data repository, a configuration data block of the plurality of configuration data blocks, the configuration data block being selected based on metadata of one data frame of the plurality of data frames flowing through one VNF of the VNF chain, the metadata of the one data frame identifying a respective version of the configuration data to be used by the plurality of sequential VNFs with respect to the plurality of data frames including the one VNF with respect to the one data frame; and
sending, in response to the single configuration data lookup from the shared data repository, a single response comprising configuration data blocks for the plurality of sequential VNFs including the selected configuration data block to the one VNF of the plurality of sequential VNFs to configure the plurality of sequential VNFs including the one VNF.

2. The method of claim 1, further comprising:
storing, in the shared data repository, a plurality of versions of the configuration data block, wherein the plurality of versions comprises a first version of the configuration data block, wherein each configuration data block version is selected for each data frame based on the metadata of the one data frame;
selecting, from the plurality of versions of the configuration data block in the shared data repository, a second version of the configuration data block based on metadata of a second data frame processed through the VNF chain subsequent to the one data frame; and
sending, from the shared data repository, the second version of the configuration data block to the one VNF to reconfigure the one VNF to process the second data frame.

3. The method of claim 2,
wherein the one VNF is reconfigured, subsequent to the one VNF processing the one data frame, using the second version of the configuration data block, and
wherein a second VNF of the plurality of sequential VNFs, downstream of the one VNF in the VNF chain, being reconfigured, processes the second data frame based on a respective second version of the configuration data block if an upstream VNF in the VNF chain processed the second data frame based on the second version of the configuration data block.

4. The method of claim 2,
wherein selecting each configuration data block version comprises traversing a hierarchical versioning data structure based on an identifier conveyed with each data frame to retrieve the configuration data block for the data frame.

5. The method of claim 4, further comprising:
generating, based on an access history of the shared data repository by the plurality of sequential VNFs, a cache for reconfiguration of the plurality of sequential VNFs; and
retrieving, from the cache, a version of a respective configuration data block for sending to each VNF,
wherein retrieving each configuration data block from the cache comprises selecting a previously retrieved version of the configuration data block for a subsequent VNF in response to detecting a cache hit for a same data frame from an upstream VNF in the VNF chain, and retrieving a latest version of the configuration data block otherwise.

6. The method of claim 1,
wherein the VNF chain comprises a service function path,
wherein processing each data frame is based on a service function chain of the service function path, and
wherein the service function chain comprises one selected from a group consisting of an encapsulation function, a weight random early detection function, and a traffic manager shaping function.

7. A system for processing a plurality of data frames employing a virtual network function (VNF) chain within a network node, comprising:
a shared data repository for storing configuration data used to configure a plurality of sequential VNFs of the VNF chain in the network node, the shared data repository configured to store the configuration data as a plurality of configuration data blocks, each configuration data block including VNF data used by a respective VNF for processing a data frame;
a computer processor; and
memory storing instruction, when executed, causing the computer processor to:
receive, by the shared data repository, a single configuration data lookup for the plurality of sequential VNFs of the VNF chain;
select, from the configuration data in the shared data repository, a configuration data block of the plurality of configuration data blocks, the configuration data block being selected based on metadata of one data frame flowing through one VNF of the VNF chain, the metadata of the one data frame identifying a respective version of the configuration data to be used by the plurality of sequential VNFs with respect to the plurality of data frames including the one VNF with respect to the one data frame; and
send, in response to the single configuration data lookup from the shared data repository, a single response comprising configuration data blocks for the plurality of sequential VNFs including the selected configuration data block to the one VNF of the plurality of sequential VNFs to configure the plurality of sequential VNFs including the one VNF.

8. The system of claim 7, the instructions, when executed, further causing the computer processor to:
store, in the shared data repository, a plurality of versions of the configuration data block,
wherein the plurality of versions comprises a first version of the configuration data block, wherein each configuration data block version is selected for each data frame based on the metadata of the one data frame.

9. The system of claim 8,
wherein selecting each configuration data block version comprises traversing a hierarchical versioning data structure based on an identifier conveyed with each data frame to retrieve the configuration data block for the data frame.

10. The system of claim 9, the instructions, when executed, further causing the computer processor to:
generate, based on an access history of the shared data repository by the plurality of sequential VNFs, a cache for reconfiguration of the plurality of sequential VNFs; and
retrieve, from the cache, a version of a respective configuration data block for sending to each VNF.

11. The system of claim 10,
wherein retrieving each configuration data block from the cache comprises selecting a previously retrieved version of the configuration data block for a subsequent VNF of the plurality of sequential VNFs in response to detecting a cache hit for a same data frame from an upstream VNF in the VNF chain, and retrieving a latest version of the configuration data block otherwise.

12. The system of claim 7,
wherein the shared data repository stores a plurality of versions of the configuration data block, wherein the plurality of versions comprises a first version of the configuration data block, wherein each configuration data block is selected for each data frame based on the metadata of the data frame;
the instructions, when executed, further causing the computer processor to
select, from the plurality of versions of the configuration data block in the shared data repository, a second version of the configuration data block based on metadata of a second data frame processed through the VNF chain subsequent to the one data frame; and
send, from the shared data repository, the second version of the configuration data block to the one VNF to reconfigure the one VNF to process the second data frame.

13. A non-transitory computer readable medium storing instruction for processing a plurality of data frames employing a virtual network function (VNF) chain within a network node, the instructions, when executed, causing a computer processor to:
store, in a shared data repository, configuration data used to configure a plurality of sequential VNFs of the VNF chain within the network node, the configuration data being stored as a plurality of configuration data blocks, each configuration data block including VNF data used by a respective VNF for processing a data frame;
receive, by the shared data repository, a single configuration data lookup for the plurality of sequential VNFs of the VNF chain;
select, from the configuration data in the shared data repository, a configuration data block of the plurality of configuration data blocks, the configuration data block being selected based on metadata of one data frame of the plurality of data frames flowing through one VNF of the VNF chain, the metadata of the one data frame identifying a respective version of the configuration data to be used by the plurality of sequential VNFs with respect to the plurality of data frames including the one VNF with respect to the one data frame; and
send, in response to the single configuration data lookup from the shared data repository, a single response comprising configuration data blocks for the plurality of sequential VNFs including the selected configuration data block to the one VNF of the plurality of sequential VNFs to configure the plurality of sequential VNFs including the one VNF.

14. The non-transitory computer readable medium of claim 13, the instructions, when executed, further causing the computer processor to:
store, in the shared data repository, a plurality of versions of the configuration data block,
wherein the plurality of versions comprises a first version of the configuration data block, wherein each configuration data block version is selected for each data frame based on the metadata of the data frame.

15. The non-transitory computer readable medium of claim 14,
wherein selecting each configuration data block version comprises traversing a hierarchical versioning data structure based on an identifier conveyed with each data frame to retrieve the configuration data block for the data frame.

16. The non-transitory computer readable medium of claim 15, the instructions, when executed, further causing the computer processor to:
generate, based on an access history of the shared data repository by the plurality of sequential VNFs, a cache for reconfiguration of the plurality of sequential VNFs; and
retrieve, from the cache, a version of a respective configuration data block for sending to each VNF,
wherein retrieving each configuration data block from the cache comprises selecting a previously retrieved version of the configuration data block for a subsequent VNF in response to detecting a cache hit for a same data frame from an upstream VNF in the VNF chain, and retrieving a latest version of the configuration data block otherwise.

* * * * *